(12) United States Patent
Draganov et al.

(10) Patent No.: US 11,674,572 B2
(45) Date of Patent: Jun. 13, 2023

(54) DRIVE DEVICE FOR A MOVABLE TAPPET

(71) Applicant: OTTO-VON-GUERICKE-UNIVERSITAT MAGDEBURG, Magdeburg (DE)

(72) Inventors: Denis Draganov, Magdeburg (DE); Oleksandr Tyshakin, Magdeburg (DE)

(73) Assignee: OTTO-VON-GUERICKE-UNIVERSITAT MAGDEBURG, Magdeburg (DE)

( * ) Notice: Subject to any disclaimer, the term of this patent is extended or adjusted under 35 U.S.C. 154(b) by 294 days.

(21) Appl. No.: 16/603,038

(22) PCT Filed: Oct. 12, 2017

(86) PCT No.: PCT/DE2017/100870
§ 371 (c)(1),
(2) Date: Oct. 4, 2019

(87) PCT Pub. No.: WO2018/192595
PCT Pub. Date: Oct. 25, 2018

(65) Prior Publication Data
US 2021/0054913 A1    Feb. 25, 2021

(30) Foreign Application Priority Data

Apr. 20, 2017    (DE) .......................... 202017102338.9

(51) Int. Cl.
*H02K 7/06*      (2006.01)
*F16H 25/20*    (2006.01)

(52) U.S. Cl.
CPC ........... *F16H 25/2015* (2013.01); *H02K 7/06* (2013.01); *F16H 2025/2078* (2013.01)

(58) Field of Classification Search
CPC ...................... H02K 1/2786; F16H 2025/2078
See application file for complete search history.

(56) References Cited

U.S. PATENT DOCUMENTS 9,003,903 B2 *  4/2015  Drumm ................... F16H 25/20
                                                                 74/89.23
9,548,637 B2    1/2017  Rapp et al.
(Continued)

FOREIGN PATENT DOCUMENTS

DE         100003129 A1    8/2001
DE      102009007958 A1   10/2010
(Continued)

*Primary Examiner* — Randell J Krug
(74) *Attorney, Agent, or Firm* — Hinckley Allen & Snyder, LLP; Stephen Holmes

(57) ABSTRACT

The disclosure relates to a drive device (V) for producing a translational motion of a movable tappet (8) by means of an electromagnetic rotating machine. The drive device includes an inner rotor (4) and an outer coaxial stator (5) and has a movement-thread pair integrated coaxially in the stator. The movement-thread pair comprising a lead screw (6), which is coupled to the rotor for conjoint rotation, and a threaded nut (7), which is linearly guided in a stator sleeve (2) in a rotationally fixed manner and is rigidly coupled to the tappet. The rotor is guided for rotation around the stator and a torque being transferred from the rotor to the lead screw by means of a thin-walled flange (10). A rotational fixation (11) of the threaded nut in the cavity of the stator sleeve is provided as a result of interlocking joining of the two.

10 Claims, 3 Drawing Sheets

(56) References Cited

U.S. PATENT DOCUMENTS

Figure 1:
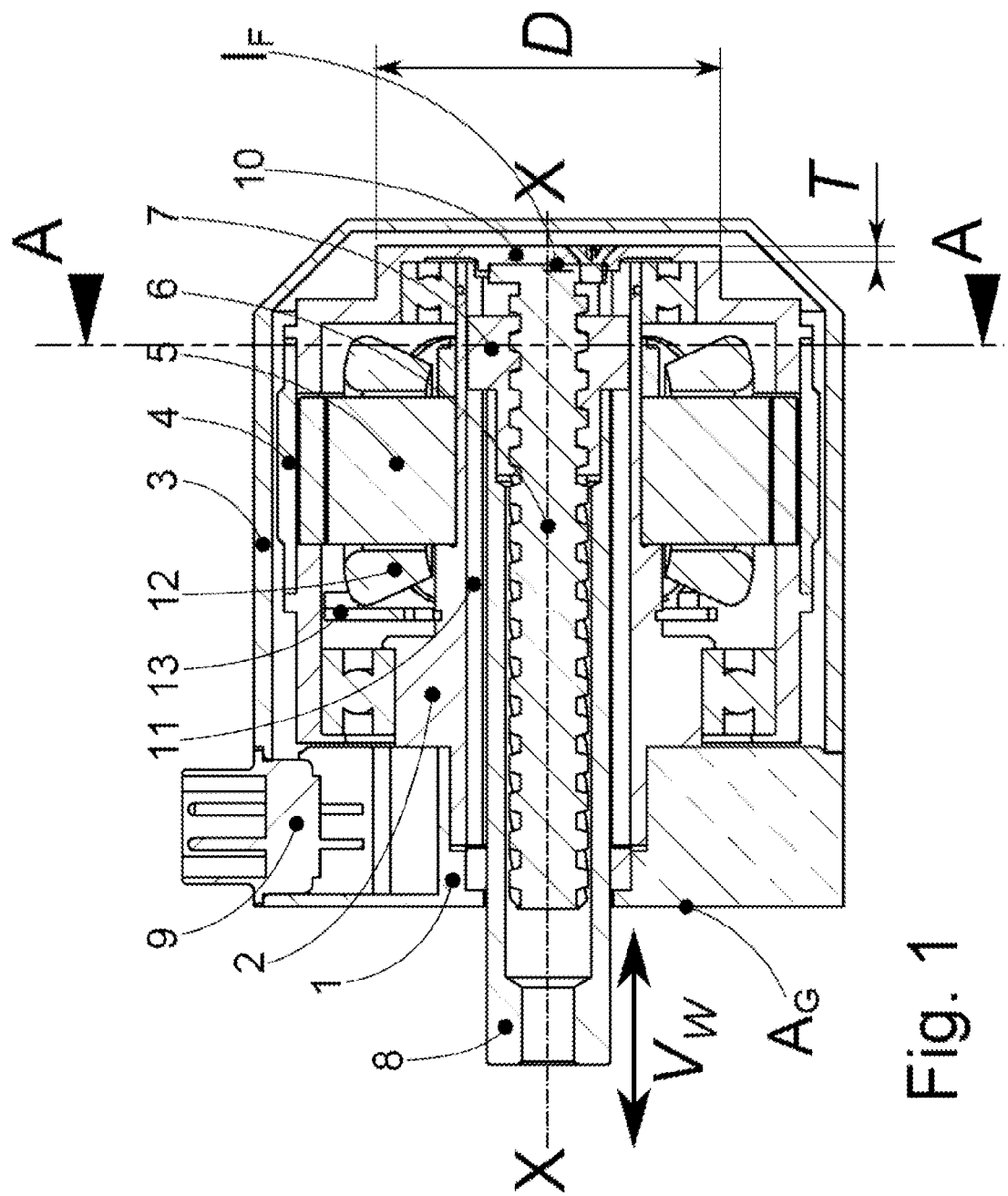

| | | | | |
|---|---|---|---|---|
| 2005/0035673 A1* | 2/2005 | Lafontaine | ............... | H02K 9/06 |
| | | | | 310/58 |
| 2006/0053577 A1* | 3/2006 | Moein | ..................... | B60S 1/166 |
| | | | | 15/250.3 |
| 2007/0169578 A1* | 7/2007 | Christensen | ........ | F16H 25/2021 |
| | | | | 74/625 |
| 2014/0028125 A1* | 1/2014 | Arai | ....................... | H02K 16/00 |
| | | | | 310/62 |
| 2018/0123405 A1* | 5/2018 | Tang | ........................ | H02K 5/22 |

FOREIGN PATENT DOCUMENTS

| | | | |
|---|---|---|---|
| DE | 102010039916 A1 | | 3/2011 |
| DE | 102013005732 A1 | | 10/2014 |
| DE | 102014214095 A1 | | 1/2016 |
| DE | 102016105098 A1 | | 9/2016 |
| DE | 102015219502 A1 * | 1/2017 | .............. H02K 7/06 |
| DE | 102015219502 A1 | | 1/2017 |
| DE | 202017102338 U1 | | 6/2017 |

* cited by examiner

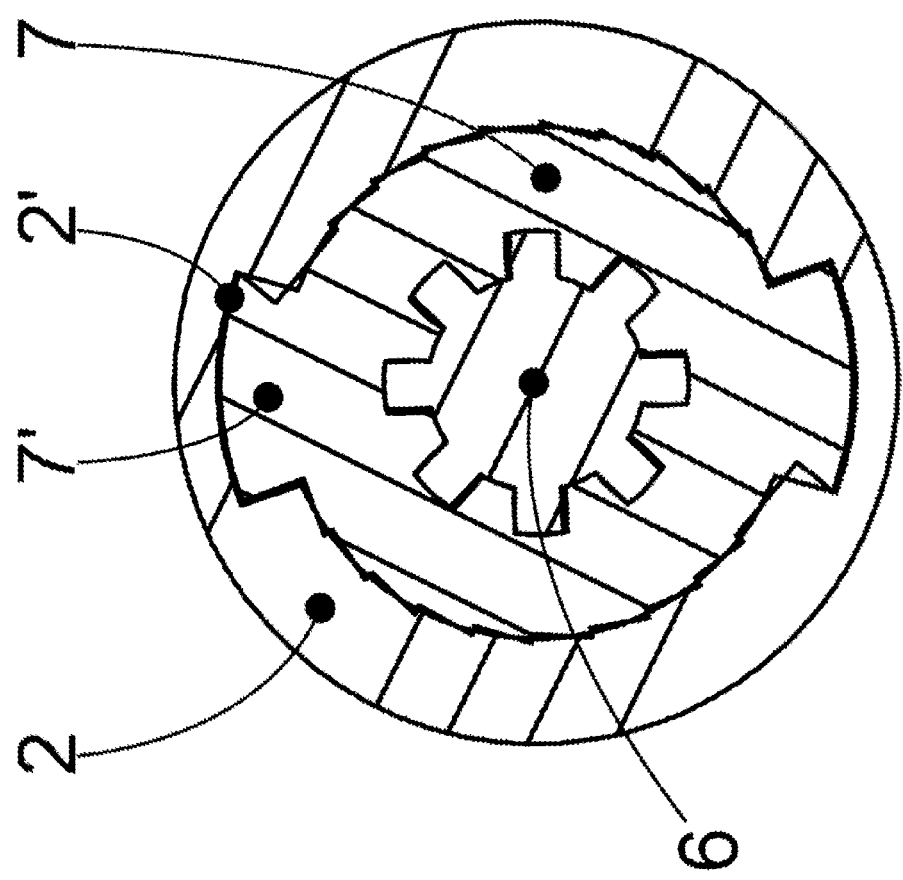

DRIVE DEVICE FOR A MOVABLE TAPPET

The invention relates to a drive device for converting a rotational movement of a rotor of an electromagnetic rotating machine into a translational movement of a movable tappet.

Known from DE 10 2013 005 732 A1 and U.S. Pat. No. 9,548,637 B2 are stepper BLDG and DC motors with frictional connection of a rotor to a spindle via a tapered press fit, wherein the corresponding connection elements with inner and outer tapers take up a great deal of space in the axial direction and thus increase the total length of the arrangement for the given travel path.

In addition, the arrangement proposed in DE 10 2013 005 732 A1 and U.S. Pat. No. 9,548,637 B2 provides a spacer 5, which likewise increases the total length of the arrangement, in this case without contributing to the travel path or to the driving force.

Known from DE 10 2015 219 502 A1 is a linear actuator whose linear movement is provided by means of a threaded pair composed of a long, threaded nut (lead screw arrangement 6) extending through the rotor and of a shorter spindle piece (threaded section 35).

The manufacturing cost of such a threaded pair constellation, however, is clearly higher than that for a conventional design with a short threaded nut and a long threaded spindle or lead screw; therefore, the construction must aim at keeping the length of the components provided with the inner thread as short as possible.

The rotationally fixed linear guide according to DE 10 2015 219 502 A1 is produced by means of a guide rod that is polygonal in cross section (guide section 34; 54; 74), whose sealing relative to the surroundings requires a complicated measure.

Known from DE 100 03 129 A1 is an arrangement of the motor and of the threaded pair composed of a long threaded nut 8 and a spindle 6, this arrangement being similar to the arrangement of the motor and the threaded pair in DE 10 2015 219 502 A1; thus the above-named problems of DE 10 2015 219 502 A1 are encountered to the same extent for the arrangement disclosed here.

In addition, the arrangement in DE 10 2015 219 502 A1 provides an intermediate wall 31, which considerably adversely affects the magnetic coupling between the stator and the rotor and thus reduces the power density of the drive.

Known from DE 10 2016 105 098 A1 is an embodiment wherein the motor (here a switched reluctance motor) converts its rotational movement into linear movement by means of a threaded pair (lead screw 70) and a threaded drilled hole 78). Here, of course, the mechanical transfer takes place outside the motor and thus takes up additional installation space.

Against this background, the object of the present invention consists in overcoming the indicated disadvantages.

This object is now achieved with a device according to claim 1. Additional advantageous embodiments are taken from the dependent claims.

Proposed is a drive device 1' for generating a translational movement of a movable tappet 8 by means of an electromagnetic rotating machine, comprising at least:
  a rotor 4;
  a stator 5 arranged coaxially to the rotor 4, the stator having at least one movement-thread pair integrated coaxially therein, comprising a lead screw 6, which is coupled to the rotor 4 for conjoint rotation, and a threaded nut 7, which is guided linearly in a rotationally fixed manner in a stator sleeve 2, and which is rigidly coupled to the tappet 8, wherein
  the rotor 4 is guided in a rotational movement around the stator 5, wherein
  the transfer of a torque from the rotor 4 to the lead screw 6 takes place by means of a thin-walled flange 10, wherein
  a rotational fixation or an anti-twist lock 11 of the threaded nut 7 is provided in the recess of the stator sleeve 2 by a form-fitting interlocking of the two.

In this case, the anti-twist lock comprises at least the following components:

Preferably, the rotor 4 can be guided around the stator 5 by outside rotational movement, whereby, on the one hand, the rotor 4 offers a large interaction surface facing the stator 5 and thus exercises a coherent large driving force; on the other hand, it offers a recess 14 for the inner transfer mechanism 6, 7.

Preferably, the lead screw 6 extends through the entire length of the drive device 1', beginning from the inner surface $I_F$ of the flange 10, in order to completely exploit the length of the drive device 1' for a usable travel path $V_W$ of the tappet 8, although shorter or longer designs of the lead screw 6 can also be considered. For example, the lead screw 6 can extend from the inner surface $I_F$ of the flange 10 up to an outer surface $A_G$ of the housing flange 1.

One embodiment pf the invention provides that the drive device 1' is formed as an inner rotor or as an outer rotor, and can belong to the following motor types:
  synchronous motors including transverse flux motors and reluctance motors and stepper motors;
  asynchronous motors;
  electronics-commutated DC motors; or
  brush-commutated DC motors.

The thin-walled flange 10 takes up a minimum installation length in the axial direction, i.e., in the direction of the X axis and maximizes a usable travel path $V_W$ of the tappet 8.

The term "thin-walled" in the case of the drive device 1' according to the invention is understood to mean that the ratio of a diameter D to a wall thickness T is greater than 10, i.e., D/T>10.

In another embodiment of the invention, it is provided that an electrical connection 9 for a power supply and/or signal transmission for the magnetic and/or optical contact or contact-free detection of the linear movement of the tappet 8 and/or of the rotational movement of the rotor 4 is arranged in a housing flange 1.

In this case, the electrical connection 9 can be formed as a plug connector, as a cable design or the like.

In addition, it is provided that a sensor system 13 for the detection of rotational movement of the rotor 4 is provided in the drive device 1'.

Also, the linear movement of the tappet 8 can be detected via the sensor system 13 or a similar system.

In another embodiment of the invention, it is provided that the actuation of the electromagnetic rotating machine of the drive device 1' takes place without a sensor.

For example, the sensor-free actuation can be produced by an analysis of the power signals of the electromagnetic rotating machine.

The mode of operation of the drive device 1' is generally constructed according to the principle of an electromagnetic rotating machine, which is coupled to a movement-thread pair. Whereby one of the threaded partners is coupled to the rotor in a rotationally fixed manner, and the other partner is guided linearly and thus feeds forward a translational movement to the tappet.

Particular advantages of the drive device 1' are, for example:

Compactness:

The telescopically capable arrangement of the coaxially lying mechanical and electrical components permits a nesting of the tappet 8 with its transfer mechanism (threaded pair 6, 7), as well as the linear guidance thereof with the anti-twist lock 11 within the drive device 1', in this case, without needing to forfeit the reduction in the power and the force of the electromagnetic rotating machine. This thus brings about a very favorable ratio of the travel path $V_W$ of the tappet 8 for the total length of the drive device 1'.

Low Manufacturing Costs:

For example, an electromagnetic rotating machine of the drive device 1' can be designed as a BLDG motor with PM excitation. A high power density is obtained thereby with relatively simple actuation and thus a less expensive control and power electronics is used.

Relatively High Adjusting Force with Lower Manufacturing Costs:

An outer-rotor motor arrangement permits a larger surface for an interaction between rotor 4 and stator 5. This causes a high torque and, in the case of a force on tappet 8 that remains the same, leads to the greater pitch of the threaded pair. With the same travel time, the greater thread pitch permits a lower rotational speed. A lower rotational speed has a smaller power supply requirement as a consequence and thus permits smaller currents both for the peak value as well as also for the mean value. The power electronics can thus be designed in a more favorable/less expensive manner.

An outer-rotor motor arrangement simplifies the assembly of windings 12 that can be installed from outside, e.g., as slip-on coils on the laminated stator core 5. Also, the magnets in the rotor 4 do not require any additional securing against centrifugal force. The manufacturing costs are considerably reduced in this way.

Moreover, a particular motor topology is present in the form of fractional slot concentrated windings (FSCW), which have an unconventional ratio of stator and rotor poles and are characterized by a particularly high torque. This leads to the greater pitch of the threaded pair with the force on the tappet 8 remaining the same. With the same travel time, the greater thread pitch permits a lower rotational speed. A lower rotational speed has a smaller power supply requirement as a consequence and thus permits smaller currents both for the peak value as well as also for the mean value. The power electronics can thus be designed in a more favorable/less expensive manner.

An outer-rotor motor arrangement permits a form-fitting interlocking of the rotor 4 to the lead screw 6 via a thin flange 10 and thus the total axial length can be better exploited for the usable travel path.

In comparison to an inner rotor, an outer rotor motor arrangement permits a simpler accommodation of the linear guide plus an anti-twist lock 11 within the stator tube 2. A polygonal recess, which represents a type of key connection for the anti-twist lock 11, may be produced in a relatively cost-effective or favorable manner, for example, by an extrusion method.

A tappet 8 that is smooth, for example, permits a good sealing of the drive device 1', which is of essential importance for a long service life. The anti-twist lock 11, which is integrated in the stator tube 5 or the stator sleeve 5, reduces the stress of the seal to only one translational component of the relative movement.

The cross section of the tappet 8 can be round in shape, whereby an optimal seal of the drive device 1' against external influences is ensured.

The proposed linear guide with the anti-twist lock 11 and the threaded pair 6, 7 can be executed as a sliding body. This permits a more compact construction as well as a less expensive one, for example when compared with a ball screw spindle. A lubricant-free application is possible, for example, due to the use of high-performance plastics, e.g., "IGLIDUR", whereby a longer service life and/or maintenance-free service life is/are ensured.

The drive device 1' according to the invention provides for being able to replace parts that are susceptible to wear with little expense. Likewise, the transfer ratio can be adapted to the customers' requirements in that, via a smaller thread pitch, among other things, a self-locking behavior of the threaded pair 6, 7 is obtained, in this case without modifying the electromagnetic rotating machine.

A very favorable constellation of the threaded pair 6, 7 can be implemented by the mechanical force transfer chain that lies at the basis of the invention.

A combination of a short threaded nut 7 with a long lead screw 6 can be realized. The manufacturing expense for a comparable inner thread is clearly higher than that of the outer thread.

The drive device 1' according to the invention can function, for example, as a direct replacement for pneumatic short stroke cylinders and thus aligns itself to the performance characteristics typical for pneumatic cylinders, such as:

compact dimensions (favorable ratio—travel path to total length);
high dynamics;
high adjusting force;
long service life;
low purchase price.

As fields of application for the drive device 1', various manufacturing lines with a high degree of automation are taken into consideration, such as:

packaging and sorting machines;
woodworking;
machine tools.

Furthermore, the drive device 1' according to the invention can be utilized for the following applications:

automotive engineering;
automation systems,
logistics, etc.

Figure 2:
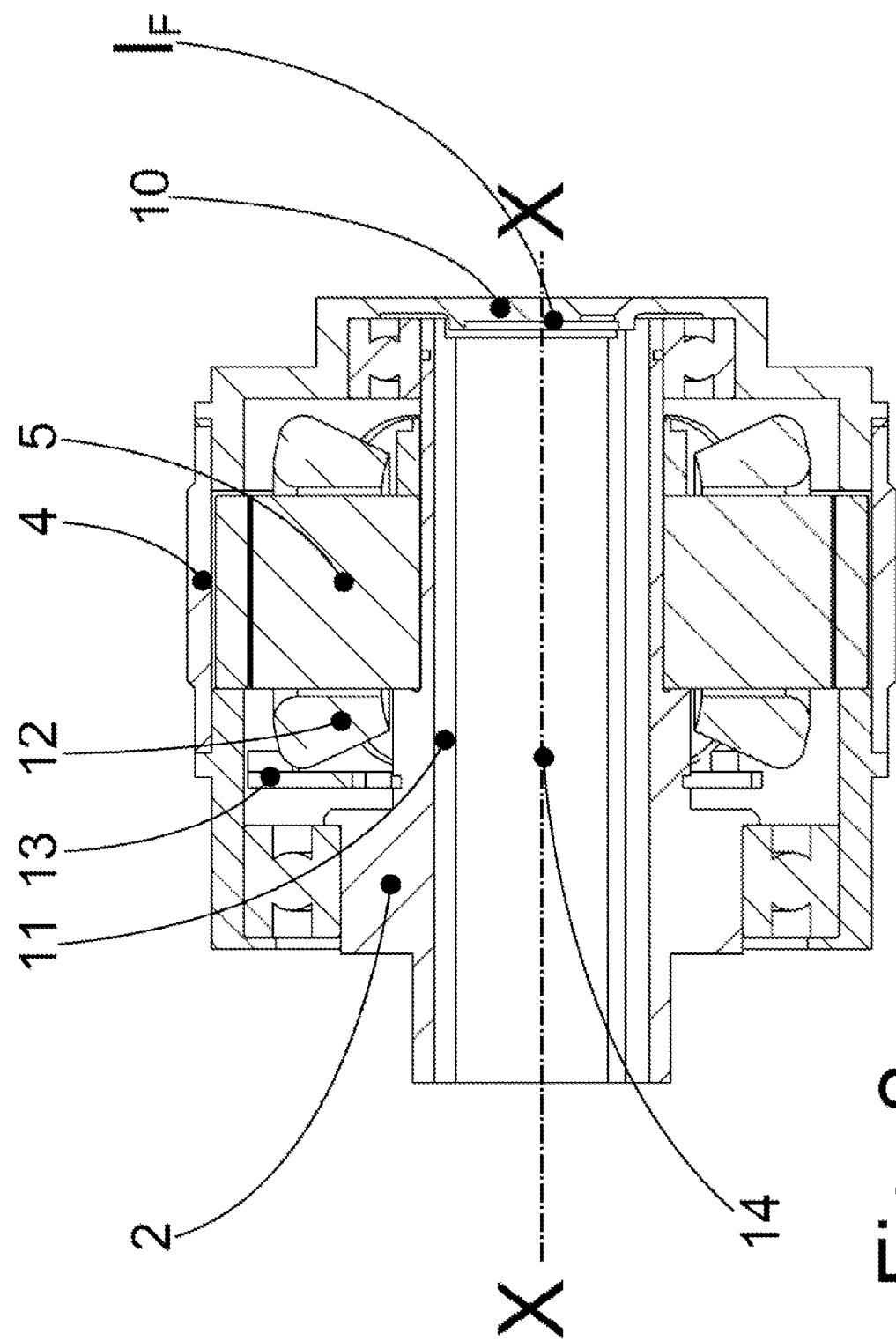

The invention will be explained in the following based on figures, wherein the invention is not limited thereto:

Herein:

FIG. 1 shows schematically a drive device 1' for generating a translational movement of a movable tappet 8 by means of an electromagnetic rotating machine;

FIG. 2 shows schematically a recess 14 inside the drive device 1' from FIG. 1; and FIG. 3 shows schematically an excerpt from a sectional view A-A of the drive device 1' from FIG. 1 in the region of the threaded nut 7.

FIG. 1 shows schematically a drive device 1' for generating a translational movement of a movable tappet 8 by means of an electromagnetic rotating machine.

The drive device 1' can comprise, for example, the following components: a housing flange 1 with a stator tube or a stator sleeve 2, a covering hood 3, a rotor 4, a stator 5 or a laminated stator core 5, on which are disposed windings 12, which are connected to a sensor system 13, a lead screw 6 with a threaded nut 7 and a tappet 8, as well as a connection 9 for a control and power electronics.

The stator 5 is arranged coaxially to the rotor 4 and comprises at least one movement-thread pair 6. 7 integrated coaxially therein, comprising a lead screw 6, which is coupled in a rotationally fixed manner to the rotor 4, and a threaded nut 7, which is guided linearly by an anti-twist locking in the stator sleeve 2 and which is rigidly coupled to the preferably tube-shaped tappet 8, wherein the rotor 4 is guided in rotational movement around the stator 5, for example outside the stator 5, and thus, on the one hand, offers a large interaction surface facing the stator 5 and thus a cohesive large driving force can be generated.

On the other hand, this arrangement makes possible a recess 14 for the internal transfer mechanism 6, 7, 8, wherein the transfer of a torque from the rotor 4 to the lead screw 6 is produced by means of a thin-walled flange 10, which takes up only a minimum installation length in the axial direction.

The usable travel path $V_W$ of the threaded nut 7 with the tappet 8 is maximized thereby, in such a way that it extends through at least the total length of the drive device 1' with the exception of the flange 10, although shorter designs may also be considered and these are completely exploitable for a usable travel path of the tappet 8.

Also, an anti-twist lock 11 of the threaded nut 7 is provided in the guide groove 2' of the stator tube 2 or the stator sleeve 2 by way of a form-fitting interlocking of the stator tube 2 with the threaded nut 7. In this way, the cross section of the tappet 8 can be designed as round, wherewith it is ensured that an optimal sealing of the drive device 1' against external influences is present.

In this embodiment of the drive device 1', the rotor and the stator are joined to an electrical machine in such a way that the latter is designed as an outer rotor, wherein the drive device 1' can be arranged in one of the following motor types:
  synchronous motors including transverse flux motors and reluctance motors and stepper motors;
  asynchronous motors;
  electronics-commutated DC motors; or brush-commutated DC motors.

In the housing flange 1 is found an electrical connection 9 for a measurement system and/or a power supply and/or a signal transmission for the magnetic and/or optical contact or contact-free detection of the linear movement of the tappet 8 and/or the rotational movement of the rotor 4.

The electromagnetic rotating machine can be actuated without a sensor with the drive device 1' according to the invention.

FIG. 2 shows schematically a recess 14 inside the drive device 1' from FIG. 1.

FIG. 3 shows schematically an excerpt from a sectional view A-A of the drive device 1' from FIG. 1 in the region of the threaded nut 7. The lead screw 6 with the threaded nut 7 having guide tabs 7' that engage in guide grooves 2' of the stator tube 2 can be recognized.

LIST OF REFERENCE CHARACTERS

1' Drive device
1 Housing flange
2 Stator tube, 2' Guide groove of the stator tube 2
3 Covering hood
4 Rotor
5 Stator
6 Lead screw
7 Threaded nut, 7' Guide tabs of the threaded nut 7
8 Tappet
9 Connection for electronics
10 Flange
11 Anti-twist lock
12 Winding
13 Sensor system
14 Recess
$V_W$ Travel path
X X-Axis
$I_F$ Inner surface of the flange 10
$A_G$ Outer surface of the housing flange 1

What is claimed is:

1. A drive device (1') for generating a translational movement of a movable tappet (8) by means of an electromagnetic rotating machine, wherein the drive device (1') is formed as an outer rotor type drive device, comprising:
  a rotor (4); and
  a stator (5) arranged coaxially to the rotor (4), the stator having at least one movement-thread pair integrated coaxially therein, comprising a lead screw (6), which is coupled in a rotationally fixed manner to the rotor (4), and a threaded nut (7) guided linearly in a stator sleeve (2) by anti-twist locking, the nut being rigidly coupled to the tappet (8),
  spaced bearings seated between an outer surface of said stator sleeve (2) and an inner surface of the rotor (4) wherein the rotor (4) is guided in a rotational movement around an outer surface of the stator (5),
  wherein the transfer of a torque from the rotor (4) to the lead screw (6) takes place by means of a flange (10) having a wall thickness T<0.1 D, wherein D equals a diameter of the flange (10), and
  wherein an anti-twist lock (11) of the threaded nut (7) is provided in the recess of the stator sleeve (2) by a form-fitting interlocking of guide tabs (7') provided on the threaded nut (7) with guide grooves (2') provided in the stator sleeve (2),
  the guide tabs (7') being formed on a head of the threaded nut (7) which extends over an end of the tappet (8),
  the threaded nut (7) having a usable travel path Vw which extends from an inner surface $I_F$ of the flange (10) to at least an outer surface $A_G$ of the drive device (1').

2. The drive device (1') according to claim 1 further characterized in that the electromagnetic rotating machine of the drive device (1') is actuated without a sensor.

3. The drive device (1') according to claim 1, further characterized in that the drive device (1') is selected from the group of motor types consisting of:
  synchronous motors including transverse flux motors and reluctance motors and stepper motors; asynchronous motors; electronics-commutated DC motors; and brush-commutated DC motors.

4. The drive device (1') according to claim 3 further characterized in that the electromagnetic rotating machine of the drive device (1') is actuated without a sensor.

5. The drive device (1') according to claim 3 further characterized in that in a housing flange (1) is arranged an electrical connection (9) for a power supply and/or signal transmission for the magnetic and/or optical contact or contact-free detection of the linear movement of the tappet (8) and/or the rotational movement of the rotor (4).

6. The drive device (1') according to claim 5, further characterized in that a sensor system (13) is provided for detecting the rotational movement of the rotor (4).

7. The drive device (1') according to claim 1 further characterized in that in a housing flange (1) is arranged an electrical connection (9) for a power supply and/or signal transmission for the magnetic and/or optical contact or contact-free detection of the linear movement of the tappet (8) and/or the rotational movement of the rotor (4).

8. The drive device (1') according to claim 7 further characterized in that the electromagnetic rotating machine of the drive device (1') is actuated without a sensor.

9. The drive device (1') according to claim 7, further characterized in that a sensor system (13) is provided for detecting the rotational movement of the rotor (4).

10. The drive device (1') according to claim 9 further characterized in that the electromagnetic rotating machine of the drive device (1') is actuated without a sensor.

* * * * *